United States Patent Office 2,754,986
Patented July 17, 1956

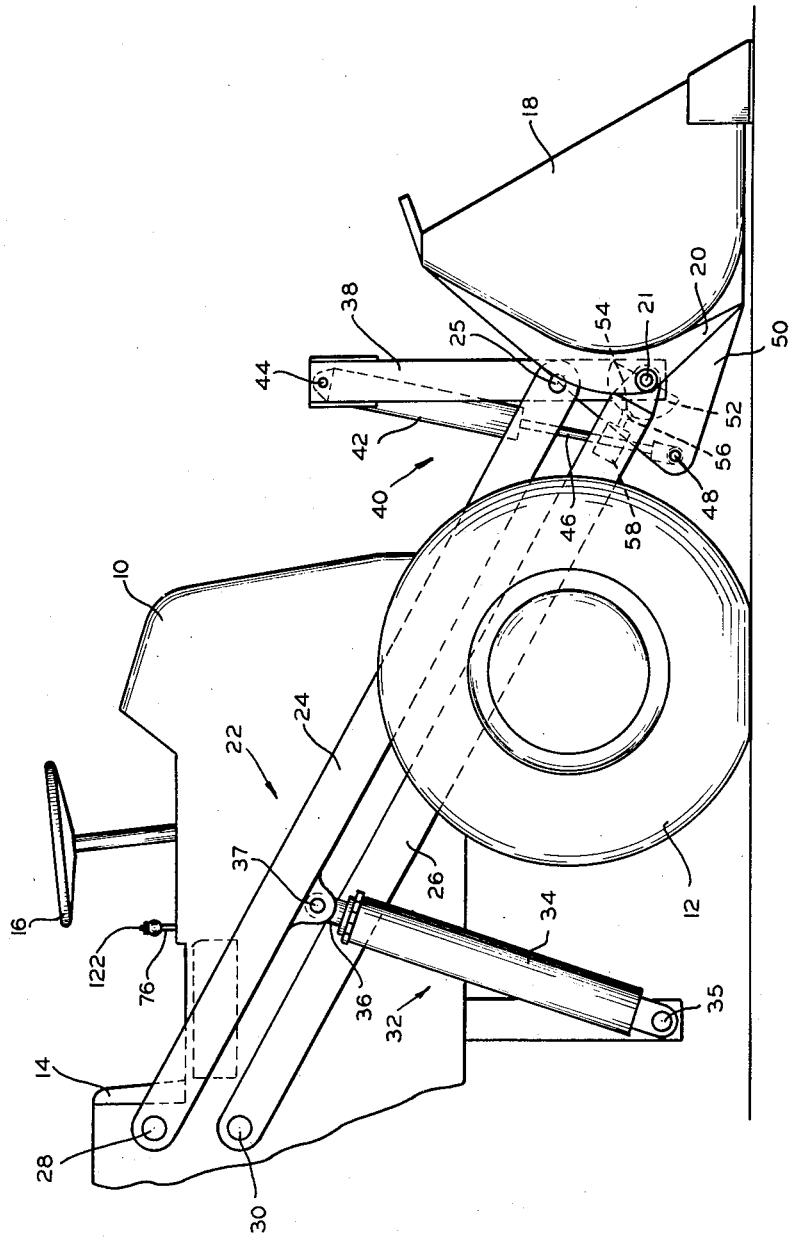

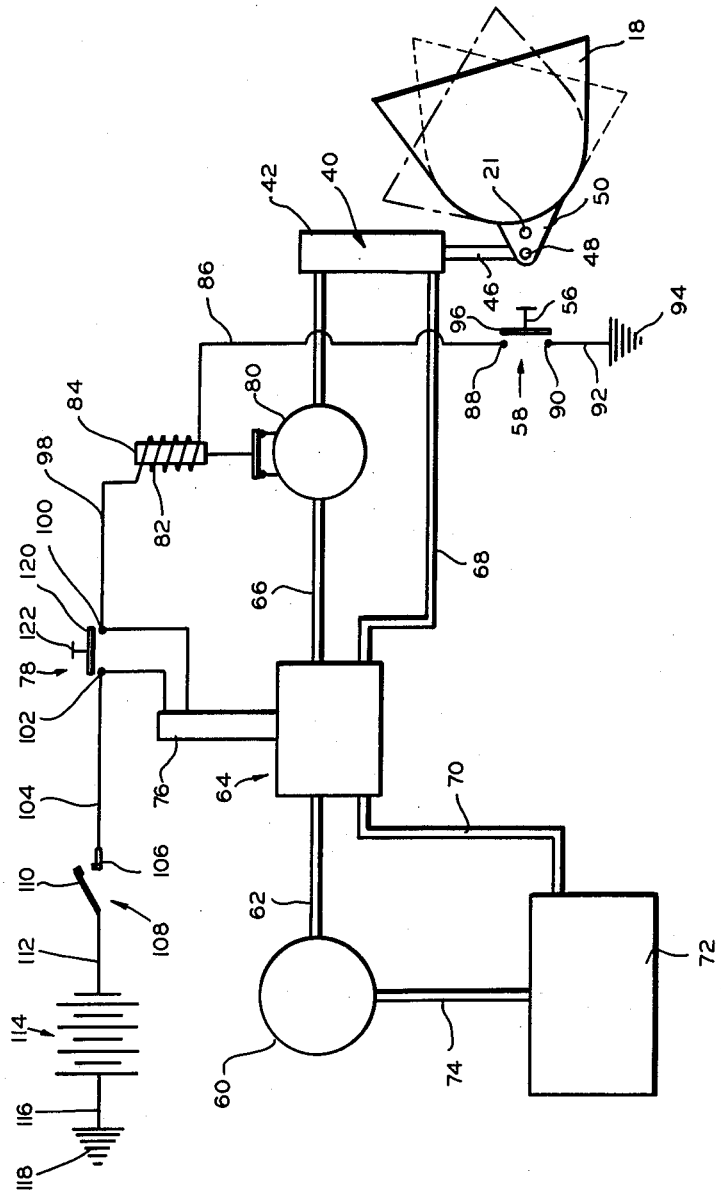

2,754,986

ELECTRICALLY CONTROLLED POSITIONING MECHANISM FOR TRACTOR SHOVELS AND THE LIKE

Donald E. Ferro, South Bend, Ind., assignor to Clark Equipment Company, a corporation of Michigan Application July 31, 1953, Serial No. 371,644

13 Claims. (Cl. 214—140)

My present invention relates generally to positioning mechanisms, and, more particularly, is concerned with electrically controlled mechanisms for positioning vehicle mounted power actuated elevatable and tiltable shovels and the like.

Tractor shovels of the general character with which my present invention may be used in a preferred form each comprises a power actuated shovel that is arranged at the forward end of a mobile tractor vehicle or industrial truck. The shovel is pivoted to the forward end of rearwardly extending arm means, the latter of which is pivoted, at its rear end, to the vehicle frame. Suitable power actuated means is provided for pivoting the arm means for effecting elevation of the shovel.

In the operation of such a tractor shovel mechanism, the shovel is generally employed in one of three main rotative positions. In one extreme rotative position of the shovel, the latter is adapted for carrying or transporting loads, while in the other extreme rotative position of the shovel, the latter is adapted for dumping its contents. No particular difficulty is encountered in providing for tilting of the shovel from one extreme rotative position to the other extreme rotative position. Neither of the designated positions, however, is suitable when it is desired to employ the shovel for scooping loose material and the like. To employ the shovel as a scoop, it must be positioned at a position intermediate the aforedescribed extreme rotative positions.

It is an object of my present invention to provide improved automatically operable means for facilitating the disposition of the shovel in an intermediate scooping position.

In accomplishing the foregoing object, power actuated means, carried by the arm means, is provided for effecting pivotal movement of the shovel relative to the arm means. In addition, means responsive to pivotal movement of the shovel relative to the arm means, is provided for interrupting selectively the power actuated means when the shovel reaches a predetermined rotative position relative to the arm means for maintaining the shovel in the designated predetermined position, which preferably is an intermediate scooping position. The interrupting means may be selectively overruled for permitting the shovel to be rotated beyond the said intermediate scooping position.

More specifically, hydraulic actuating assembly means is provided for effecting tilting of the shovel. Suitable fluid lines are arranged between the hydraulic actuating assembly means and a source of fluid pressure to provide for actuation of the former. Solenoid operated valve means is interposed in the fluid lines and electric circuit means, including a switch actuated responsively to predetermined pivotal movement of the shovel, is provided for energizing the solenoid so as to close the solenoid operated valve. Thus, by blocking or trapping fluid in the fluid lines when the shovel reaches a predetermined rotative position relative to the arm means, the shovel is stopped and held in the designated predetermined position.

Now, in order to acquaint those skilled in the art with the manner of constructing and using positioning mechanisms in accordance with my present invention, I shall describe, in connection with the accompanying drawings, a preferred embodiment of my invention.

In the drawings:

Figure 1 is a partial side elevational view of my present invention embodied with a mobile vehicle and a power actuated shovel; and Figure 2 is a diagrammatic showing of my present invention including the fluid and electrical circuits thereof.

Referring now to the drawings, there is indicated generally by the reference numeral 10 a mobile vehicle or industrial truck having drive wheels 12 at the forward end thereof. The truck 10 is further provided with an operator's seat 14, forwardly of which is arranged a hand steering wheel 16 operatively associated with the rear steering wheels (not shown) of the vehicle. Suitable prime mover and transmission means (not shown) are provided for driving the forward drive wheels 12.

Arranged at the forward end of the truck 10 is a shovel or scoop member 18 having rearwardly extending spaced apart brackets 20, which are pivotally mounted on a transverse shaft 21, carried at the forward end of rearwardly extending arm means indicated generally by the reference numeral 22. The arm means 22, as shown for purposes of illustration, comprises pairs of arm members 24 and 26, one pair of which is arranged at either side of the truck 10. The arm members 24 and 26 are respectively secured, at their rear ends, to the ends of transverse shafts 28 and 30 journaled in the frame of the truck 10. The arm members 24 and 26 constitute a parallelogram type linkage mechanism and are employed for a purpose to be more fully discussed hereinafter; however, it should be understood that my invention is not limited to use with parallelogram mechanisms but may be used equally well with other types of linkage mechanisms.

Power operated hydraulic actuating assemblies, indicated generally by the reference numeral 32, one arranged on either side of the truck 10, are provided for pivoting the arm members 24, whereby elevation of the shovel 18 may be effected. Each hydraulic actuating assembly 32 comprises a cylinder 34 pivotally mounted at 35 to the truck frame, and a piston rod 36 pivotally mounted at 37 to the adjacent arm member 24. Counterclockwise pivotal movement of the arm members 24 may be selectively effected by admitting fluid under pressure to the lower ends of the cylinders 34 for distending the piston rods 36. Clockwise pivotal movement of the arm members 24 may be effected by bleeding fluid from the lower ends of the cylinders 34, and admitting fluid under pressure to the upper ends of the cylinders. Pivotally connected to the arm members 24 at pivot points 25 and also pivotally connected to shaft 21, is a generally inverted U-shaped frame member 38 which provides support for a power operated hydraulic actuating assembly, indicated generally by the reference numeral 40. The hydraulic actuating assembly 40 comprises a cylinder 42 pivotally mounted at 44 to the bight portion of the inverted U-shaped frame member 38, and a piston rod 46 pivotally mounted at 48 to a flange member 50 suitably secured to the shovel 18. Flange member 50 preferably is located centrally with respect to the opposite ends of shovel 18.

The afore-described mechanism, when a parallelogram type linkage as shown is employed, serves to maintain the shovel 18 in any predetermined angular position relative to the ground, as the arm means 22 is pivoted for elevating the shovel 18. It will be noted that pivot points 28, 30, 25, 21 form a parallelogram, hence the designation "parallelogram-type linkage."

A segment cam 52 is rotatable with the flange member 50 about the axis of the transverse shaft 21. The outer periphery of the cam 52, which is formed with a depression or recess 54, cooperates with a cam follower 56, which is operable for opening and closing an electrical switch 58. The purpose of the cam 52 and switch 58 will be discussed more fully hereinafter.

Referring now to Figure 2, there is shown diagrammatically the shovel 18, the hydraulic actuating assembly 40, and the switch 58. Associated with the latter elements are a hydraulic fluid circuit and an electrical control circuit which I shall now describe in detail.

The trunk 10 is provided with a source of fluid pressure 60 which may, for example, comprise an hydraulic fluid pump. The delivery or pressure side of the pump 60 is connected through a fluid line 62 with a 4-way valve indicated generally by the reference numeral 64. The valve 64, in turn, is connected through a pair of fluid lines 66 and 68 with the upper and lower ends of the cylinder 42 of the hydraulic actuating assembly 40. The valve 64 further has connection through a fluid line 70 with a sump tank which, in turn, has connection through a fluid line 74 with the intake side of the pump 60. The valve 64 is provided with a control lever 76 through the actuation of which fluid under pressure may be directed to one of the fluid lines 66 or 68 while the other of these lines simultaneously is placed in communication with the return line 70. The upper end of the control lever 76 is provided with a thumb operated switch, indicated generally by the reference numeral 78, for a purpose to be discussed hereinafter.

Interposed in the fluid line 66 is a solenoid operated valve 80 having associated therewith a solenoid coil 82 which serves to operate a solenoid plunger 84 for opening and closing the valve 80.

The one end of the solenoid coil 82 has connection through an electrical line 86 with the terminal 88 of the cam actuated switch 58. The terminal 90 of the switch 58 has connection through an electrical line 92 to ground indicated at 94. The switch 58 is further provided with a switch blade 96 that is movable into engagement with the terminals 88 and 90 by suitable movement of the cam follower 56.

The other end of the solenoid coil 82 has connection through an electrical line 98 with the terminal 100 of the thumb operated switch 78. The switch 78 is further provided with a terminal 102 which has connection through an electrical line 104 with the terminal 106 of the vehicle ignition switch indicated generally at 108. The switch 108 comprises a switch blade 110 which is connected through a line 112 with one side of a battery 114. The battery has suitable connection through a line 116 with ground at 118 to complete the electric circuit. The thumb operated switch 78 further comprises a switch blade 120 which is movable into engagement with the terminals 100 and 102 through suitable movement of the thumb button 122 mounted at the upper end of the valve control lever 76. Fig. 1 shows one suitable physical embodiment of the thumb button 122 on control lever 76, although obviously many other satisfactory arrangements are possible.

With the shovel in the solid line position shown in Figures 1 and 2, material may be scooped up merely by driving the vehicle 10 forwardly. After sufficient material has been received within the shovel 18, the operator of the vehicle may operate the control lever 76 for admitting fluid under pressure from the pump 60 through the lines 62 and 66 to the upper end of the cylinder 42 of the tilt assembly 40. The piston rod 46 will be distended downwardly causing counterclockwise movement of the shovel 18 from the solid line scooping position to the dot dash line load transporting position. In the latter position of the shovel 18, a load may be conveniently transported from one location to another after the shovel has been elevated by the hydraulic actuating assembly 32 in the manner described in detail hereinbefore.

After the truck has been driven to the location where the contents of the shovel 18 are to be deposited, the control lever 76 may be actuated for admitting fluid under pressure from the pump 60 through the lines 62 and 68 to the lower end of the cylinder 42. Such flow of fluid causes the piston rod 46 to be moved within the cylinder 42 for effecting clockwise pivotal movement of the shovel 18 from the dot-dash line load transporting position to the dash line dumping position.

If it should now be desired to dispose the shovel 18 in the solid line scooping position, the operator of the vehicle need only close the switch 78, by depressing the thumb button 122 for moving the switch blade 120 into engagement with the terminals 100 and 102, and actuate the control lever 76 for directing fluid under pressure through the line 66 to the upper end of the cylinder 42.

Now, as will be recognized by those skilled in the art, it is extremely difficult to return the control lever 76 to neutral at precisely the proper time for stopping the flow of fluid through the line 66 when the shovel 18 has been pivoted counterclockwise to the solid line scooping position. It is at this point that my present invention becomes operative. As the fluid enters the upper end of the cylinder 42, the piston rod 46 is distended for effecting counterclockwise pivotal movement of the shovel 18. During such counterclockwise pivotal movement of the shovel 18, the cam 54 maintains the switch 58 open until the shovel 18 reaches the solid line position at which time the cam follower 56 is received within the cam groove 54 for closing the switch 58. Now when the cam switch 58 is closed, since the thumb switch 78 and the ignition switch 108 are also closed, the solenoid coil circuit is energized for causing the solenoid plunger 84 to be moved into a position closing the valve 80. Thus, as the scoop 18 reaches the solid line position during its pivotal movement, the valve 80 is simultaneously closed for blocking further fluid flow to the upper end of the cylinder 42. Consequently, the shovel 18 is automatically positioned in an intermediate scooping position.

If the shovel 18 is to be pivoted to the load carrying position shown in dot dash lines, the operator need only release the thumb button 122 for permitting the switch 78 to be opened whereupon the solenoid coil 82 is deenergized and the valve 80 is, in turn, opened. Then, upon continued actuation or renewed actuation of the control lever 76 fluid flow through the line 66 to the upper end of the cylinder 42 is reestablished for effecting further pivoting of the shovel 18.

The shovel 18 likewise may be returned from the load carrying dot dash line position to the solid line scooping position simply by depressing the thumb button 122 for closing the switch 78 and actuating the control lever 76 for admitting fluid under pressure through the line 68 to the lower end of the cylinder 42. As soon as the solid line position is reached by the shovel 18, the cam follower 56 is received in the cam groove 54, and thereby closes the switch 58 for establishing the electrical circuit through the solenoid coil 82, whereupon the valve 80 is closed for blocking the return of fluid from the upper end of the cylinder 42 to the valve 64.

It is to be understood, of course, that the shovel may be pivoted directly from the dot dash line load carrying position to the dash line dumping position, and vice versa, without stopping at an intermediate solid line scooping position, simply by permitting the thumb operated switch 78 to remain open during actuation of the control lever 76 of the valve 64.

From the foregoing description it will be apparent that my present invention permits the shovel to be positioned positively in any one of three primary operating positions. In movement of the shovel between its three normal operating positions, no feathering of the valve 76 is required, and thus the operator's task of positioning the shovel is simplified.

Now, while I have shown and described what I believe to be a preferred embodiment of my present invention, it will be understood that various modifications and rearrangements may be made therein without departing from the spirit and scope of my invention.

I claim:

1. For use with a vehicle, the combination of a shovel carried by the vehicle and mounted for limited pivotal movement, movable means carried by the vehicle for effecting pivotal movement of said shovel, and means including means mounted for pivotal movement with said shovel for automatically interrupting movement of said movable means when said shovel reaches a predetermined pivotal position.

2. For use with a vehicle, the combination of a shovel carried by the vehicle and mounted for limited pivotal movement, movable means carried by the vehicle for effecting pivotal movement of said shovel, and means mounted for pivotal movement with said shovel, and means responsive to pivotal movement of said cam means for automatically interrupting movement of said movable means when said shovel reaches a predetermined pivotal position.

3. For use with a vehicle, the combination of a shovel carried by the vehicle and mounted for limited pivotal movement, power actuated means carried by the vehicle for effecting pivotal movement for said shovel, cam means mounted for pivotal movement with said shovel, and means responsive to pivotal movement of said cam means for interrupting said power actuated means when said shovel reaches a predetermined position for maintaining said shovel in the said predetermined position.

4. For use with a vehicle, the combination of a shovel carried by the vehicle and mounted for limited pivotal movement, hydraulic actuating assembly means carried by the vehicle for effecting pivotal movement of said shovel, a source of fluid pressure, means for establishing communicating between said source of fluid pressure and said hydraulic actuating assembly means whereby the latter may be actuated for pivoting said shovel, and means responsive to pivotal movement of said shovel for interrupting communication between said source of fluid pressure and said hydraulic actuating assembly means when said shovel reaches a predetermined pivotal position.

5. For use with a vehicle, the combination of a shovel carried by the vehicle and mounted for limited pivotal movement, hydraulic actuating assembly means carried by the vehicle for effecting pivotal movement of said shovel, a source of fluid pressure, means for establishing communication between said source of fluid pressure and said hydraulic actuating assembly means whereby the latter may be actuated for pivoting said shovel, solenoid operated valve means when energized serving to interrupt communication between said source of fluid pressure and said hydraulic actuating assembly means, and means responsive to pivotal movement of said shovel for energizing said solenoid operated valve means when said shovel reaches a predetermined pivotal position for maintaining said shovel in the said predetermined position.

6. For use with a vehicle, the combination of a shovel carried by the vehicle and mounted for limited pivotal movement, hydraulic actuating assembly means carried by the vehicle for effecting pivotal movement of said shovel, a source of fluid pressure, means for establishing communication between said source of fluid pressure and said hydraulic actuating assembly means whereby the latter may be actuated for pivoting said shovel, solenoid operated valve means when energized serving to interrupt communication between said source of fluid pressure and said hydraulic actuating assembly means, cam meeans mounted for pivotal movement with said shovel, and electric circuit means including a switch actuated by said cam means for energizing said solenoid operated valve means when said shovel reaches a predetermined pivotal position for maintaining said shovel in the said predetermined position.

7. For use with a vehicle, the combination of a shovel, arm means pivoted at one end to the vehicle and at the other end to said shovel, power actuated means carried by the vehicle and having connection with said arm means for effecting pivotal movement of the latter whereby said shovel may be raised or lowered, hydraulic actuating assembly means carried by said arm means for effecting pivotal movement of said shovel, a source of fluid pressure, means for establishing communication between said source of fluid pressure and said hydraulic actuating assembly means whereby the latter may be actuated for pivoting said shovel, solenoid operated valve means when energized serving to interrupt communication between said source of fluid pressure and said hydraulic actuating assembly means, and means responsive to pivotal movement of said shovel for energizing said solenoid operated valve means when said shovel reaches a predetermined pivotal position relative to said arm means for maintaining said shovel in the said predetermined position.

8. For use with a vehicle, the combination of a shovel carried by the vehicle and mounted for limited pivotal movement, power actuated means carried by the vehicle for effecting pivotal movement of said shovel, cam means mounted for pivotal movement with said shovel, and means including electric circuit means and a switch opertaed by said cam means for interrupting said power actuated means when said shovel reaches a predetermined pivotal position for maintaining said shovel in the said predetermined position.

9. For use with a vehicle, the combination of a shovel, arm means pivoted at one end to the vehicle and at the other end to said shovel, first power actuated means carried by the vehicle and having connection with said arm means for effecting pivotal movement of the latter whereby said shovel may be raised or lowered, second power actuated means carried by said arm means for effecting pivotal movement of said shovel, cam means mounted for pivotal movement with said shovel, and means including electric circuit means and a switch actuated by said cam means for interrupting said second power actuated means when said shovel reaches a predetermined pivotal position relative to said arm means for maintaining said shovel in the said predetermined position.

10. For use with a vehicle, the combination of a shovel carried by the vehicle and mounted for limited pivotal movement, hydraulic actuating assembly means carried by the vehicle for effecting pivotal movement of said shovel, a source of fluid pressure, fluid lines between said source of fluid pressure and said hydraulic actuating assembly means, valve means interposed in said fluid lines and serving when closed to interrupt communication between said source of fluid pressure and said hydraulic actuating assembly means, a solenoid when energized serving to close said valve means, cam means mounted for pivotal movement with said shovel, and electric circuit means including a switch actuated by said cam means for energizing said solenoid to close said valve means when said shovel reaches a predetermined pivotal position for maintaining said shovel in the said predetermined position.

11. For use with a vehicle, the combination of a shovel, arm means pivoted at one end to the vehicle and at the other end to said shovel, first power actuated means carried by the vehicle and having connection with said arm means for effecting pivotal movement of the latter whereby said shovel may be raised or lowered, hydraulic actuating assembly means carried by said arm means for effecting pivotal movement of said shovel, a source of fluid pressure, fluid lines for transmitting fluid between said source of fluid pressure and said hydraulic actuating assembly means, a manually operable valve interposed in said fluid lines whereby flow of fluid through said fluid lines may be selectively controlled, solenoid operated valve means interposed in said fluid lines and serving when closed to interrupt fluid flow through said fluid lines, cam means mounted for pivotal movement with said shovel, a solenoid when energized serving to close said solenoid operated valve means, and electric circuit means including a switch actuated by said cam means for effecting energization of said solenoid to close said solenoid operated valve means in order to block fluid flow through said fluid lines when said shovel reaches a predetermined pivotal position relative to said arm means so as to maintain said shovel in the said predetermined position.

12. A positioning system for a mechanism operable by a reciprocable hydraulic motor between two extreme positions, comprising conduit means for admitting hydraulic fluid under pressure to one portion of the motor for operation of the mechanism, additional conduit means for discharging hydraulic fluid from another portion of the motor, and electrically actuated means responsive to the movement of the mechanism for closing one conduit means whereby to position the mechanism in a selected intermediate position between the two extreme positions.

13. A positioning system for a mechanism arranged for limited pivotal movement between two extreme positions comprising, hydraulic actuating assembly means for effecting pivotal movement of the mechanism, a source of fluid pressure, means for establishing communication between said source of fluid pressure and said hydraulic actuating assembly means whereby the latter is actuated for pivoting the mechanism, solenoid operated valve means when energized serving to interrupt communication between said source of fluid pressure and said hydraulic actuating assembly means, and means responsive to pivotal movement of said mechanism for energizing said solenoid operated valve means when the mechanism reaches a predetermined pivotal position for maintaining said mechanism in the said predetermined position.

References Cited in the file of this patent

UNITED STATES PATENTS

| | | |
|---|---|---|
| 2,373,167 | Cherry et al. | Apr. 10, 1945 |
| 2,517,582 | Lull | Aug. 8, 1950 |